United States Patent [19]

Benson et al.

[11] Patent Number: 4,637,204
[45] Date of Patent: Jan. 20, 1987

[54] LAWN MOWER BEDKNIFE ADJUSTMENT

[75] Inventors: Terrance G. Benson, Union Grove, Wis.; Dean M. Lewis, Cedar Falls, Iowa

[73] Assignee: Textron Inc., Providence, R.I.

[21] Appl. No.: 690,738

[22] Filed: Jan. 11, 1985

[51] Int. Cl.[4] .................... A01D 55/32; A01D 55/20
[52] U.S. Cl. ........................................... 56/249; 56/7; 56/10.4; 83/72; 241/239; 241/287
[58] Field of Search ................... 56/6, 7, 10.9, 10.4, 56/11.9, DIG. 15, 249; 83/72, 74; 241/222, 239, 240, 241, 286, 287

[56] References Cited

U.S. PATENT DOCUMENTS

| | | | |
|---|---|---|---|
| 2,341,913 | 2/1944 | Fields | 56/249 |
| 2,651,904 | 9/1953 | Jatunn | 56/249 |
| 2,786,321 | 3/1957 | Lill | 56/249 |
| 3,106,813 | 10/1963 | Strasel | 56/249 |
| 3,187,492 | 6/1965 | Bergen | 56/249 |
| 3,680,293 | 8/1972 | Klemenhagen | 56/249 |
| 4,335,569 | 6/1982 | Keeney et al. | 56/249 |
| 4,516,388 | 5/1985 | Chandler | 56/249 |

FOREIGN PATENT DOCUMENTS 2137063 10/1984 United Kingdom ................... 56/249

Primary Examiner—Gene Mancene
Assistant Examiner—John G. Weiss
Attorney, Agent, or Firm—Arthur J. Hansmann

[57] ABSTRACT

A lawn mower for a reel type lawn mower, and including mechanism for urging the bedknife cutting edge toward the reel and for positioning the bedknife cutting edge in the direction away from the reel, if desired. The cutting edge can be positioned either with a clearance or with no clearance, relative to the reel. The adjustment is automatic and consistently the same each time it is made.

9 Claims, 2 Drawing Figures

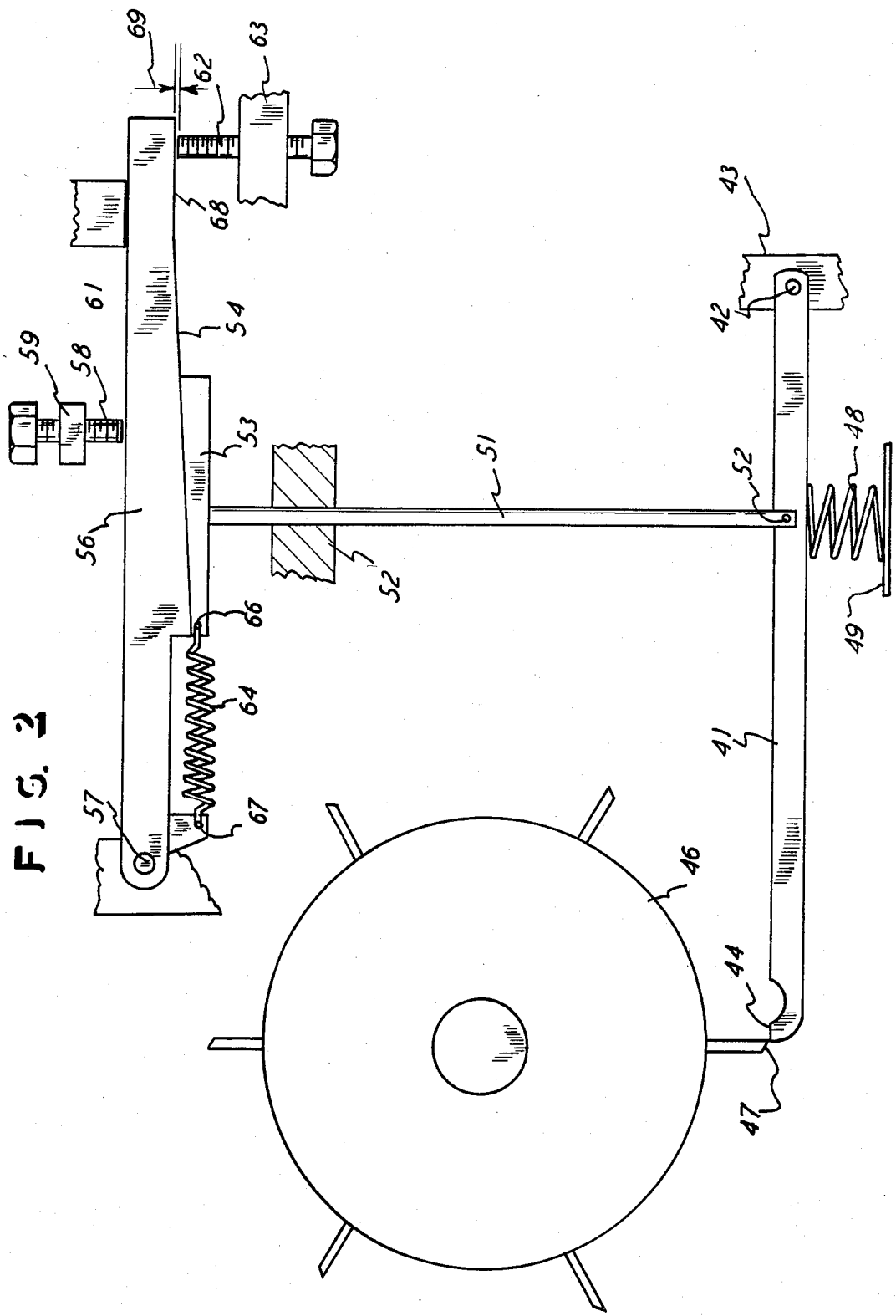

LAWN MOWER BEDKNIFE ADJUSTMENT

This invention relates to a lawn mower bedknife adjustment wherein the bedknife of a reel type lawn mower can be adjusted toward and away from the cutting blades of the reel, as desired.

BACKGROUND OF THE INVENTION

The prior art is already aware of various systems and mechanisms for adjusting a bedknife toward and away from a lawn mower cutting reel. Commonly the bedknife is pivotally mounted to move its cutting edge toward and away from the rotating reel, and the desired positioning of the bedknife cutting edge relative to the reel can be at least somewhat accomplished. Examples of the prior art are disclosed in U.S. Pat. Nos. 3,106,813 and 3,187,492 and 3,680,293 and 4,335,569. These patents generally show either a control lever or a threaded member and/or a spring for influencing the position of the bedknife relative to the reel. However, in all instances, the manual adjustment of the lever, threaded member, or whatever is employed, results in a specific positioning of the bedknife cutting edge, which positioning is established according to the manual adjustment. That is, the operator might inadvertently over or under adjust the setting, and thus the bedknife cutting edge would not be in the optimum position.

The present invention improves upon the prior art, in that it provides a bedknife adjustment system wherein the adjustment is automatic and operator error or the like does not enter into the adjustment. Further, the accomplishment of the aforementioned objective is possible even where the cutting reel and bedknife are new or worn or for other reasons are of variable sizes deviating from the conventional sizes or dimensions. Still additionally, the present invention provides for the optimum bedknife adjustment either in the position of having its cutting edge in contact or no clearance position with the cutting reel, or having the bedknife cutting edge automatically positioned at a desired specified clearance from the cutting reel. In all instances, the adjustment of the bedknife is automatic and operator inexperience, error, or the like does not enter into the consideration in the use of the adjustment system of this invention.

Further, with the present inventive concept, one embodiment thereof permits the adjustment with a specified clearance between the bedknife cutting edge and the reel, and another embodiment thereof permits the adjustment where there is no clearance therebetween. In both instances, the adjustment can be repeated and the same positioning can be achieved automatically with each adjustment. Therefore, from time to time in the use of the mower, the adjustment can be again accomplished, and that adjustment will be the same as the specified and previous adjustments, and it will be automatically accomplished and free of operator variations for whatever reason.

Still further, the present invention accomplishes all of the aforementioned objectives, and it also provides an arrangement whereby the bedknife will automatically move away from the cutting reel when any debris is between the bedknife and the cutting reel. Therefore, the present invention protects the lawn mower against damage which might otherwise occur due to debris being lodged between the bedknife cutting edge and the reel, including damage of dulling or marring the cutting surfaces.

Other objects and advantages will become apparent upon reading the following description in light of the accompanying drawings.

BRIEF DESCRIPTION OF THE DRAWINGS

FIG. 2 is a diagrammatic side-elevational view of a reel type lawn mower and showing another embodiment of this invention.

DETAILED DESCRIPTION OF THE PREFERRED EMBODIMENTS

Figure 1:
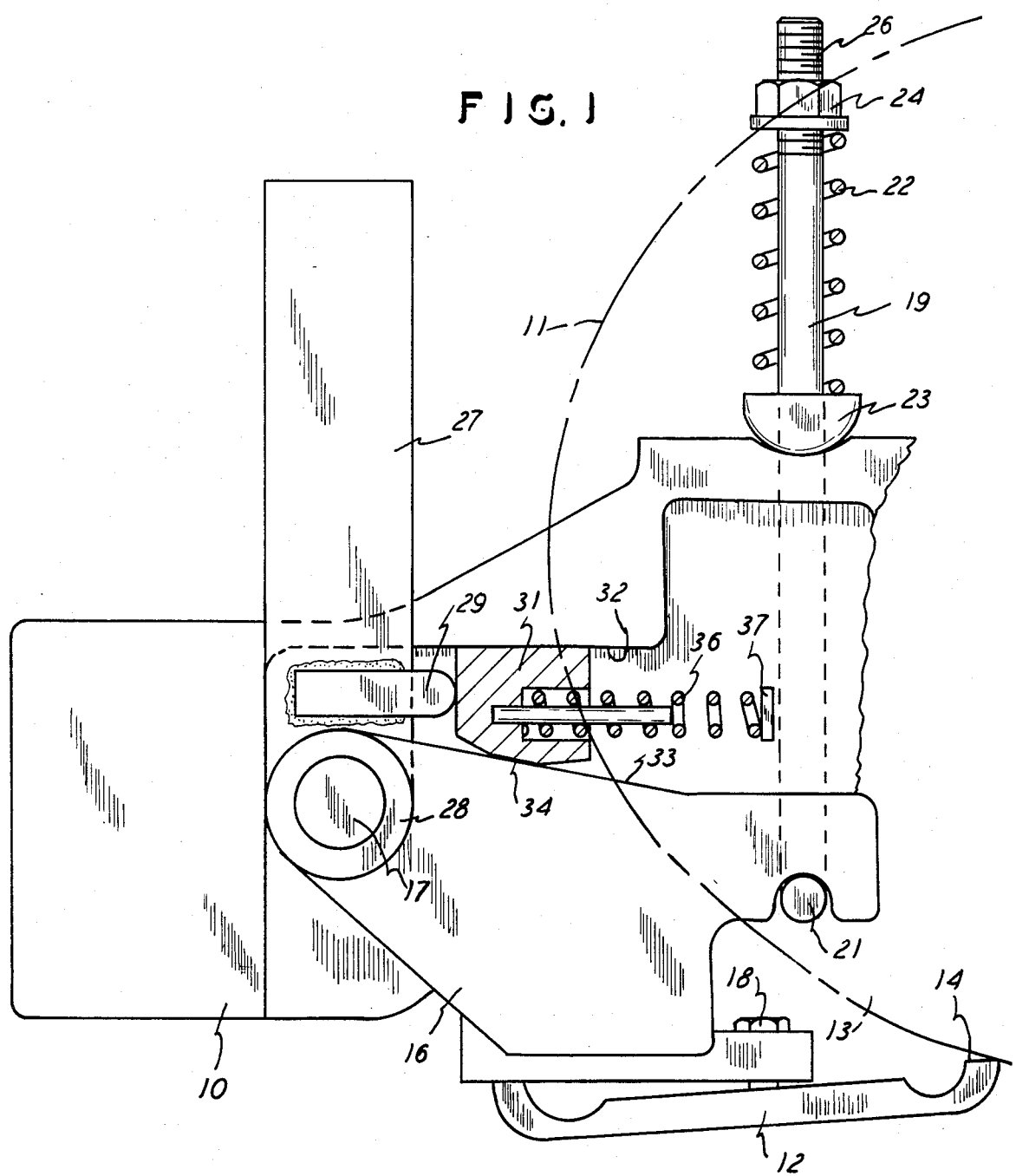
FIG. 1 is a side-elevational view of a fragment of a reel type lawn mower and showing one embodiment of this invention.

FIG. 1 shows a fragment of a reel type of lawn mower which will be readily understood by anyone skilled in the art, and it includes a frame 10 and the dot-dash line 11 represents the circumference of the conventional cutting reel, and there is a bedknife 12 suitably supported as a part of the mower and as shown. In this embodiment, the reel, now designated 13, rotates past the bedknife cutting edge 14 for the usual mowing action, and it is desired that the cutting edge 14 remain in contact with the reel circumference 11, as shown in FIG. 1.

To accomplish that, a member 16, which is considered part of the bedknife 12, is pivotally mounted on the frame 10 by means of a pin 17. A bolt 18 is shown connecting the bedknife parts 12 and 16 into one unit, so that all is pivotal about the pin 17, as seen. That is, any pivotal movement of the part 16 induces the exact pivotal movement of the bedknife part 12, since they are unitized.

An upstanding threaded member 19 has its in-turned lower end 21 connected with the bedknife part 16, and a spring 22 acts on the rod 19 to urge it upwardly. That is, a spring pad 23 bears downwardly on the frame 10, and a nut 24 provides an upper bearing for the compression spring 22, all so that the spring 22 urges the rod 19 upwardly. That induces a counterclockwise rotation of the bedknife 12, as viewed in FIG. 1, and thus the bedknife cutting edge 14 is yieldingly urged toward the reel 13, to the position shown in FIG. 1. Of course it will also be readily understood that if any debris comes between the bedknife 12 and the reel 13, then that debris will simply cause a compression in the spring 22 which will release the debris and avoid damage to the mower. The upper end 26 of the rod 19 is threaded, and thus the compression on the spring 22 and therefore the force of the bedknife cutting edge 14 against the reel 13 is adjustable.

An upstanding lever 27 is also pivotally mounted on the pin 17 by means of a hub 28 on the lower end of the lever 27. A pusher 29 is affixed, such as by welding, to the lever 27, and extends to the right therebeyond, as seen in FIG. 1. Accordingly, rotation of the lever 27 and the clockwise direction about the pin 17, as viewed in FIG. 1, will cause the pusher 27 to move to the right. However, the bedknife assembly 12 will still be under the influence of the spring 22, that is, in the counterclockwise position where the cutting edge 14 is against the reel 13.

A wedge 31 is moveably disposed between the frame surface 32 and an upper inclined edge 33 of the bedknife part 16. Thus, the wedge 31 has an incline surface 34 which matches the surface 33, as shown. When the lever 27 is rotated clockwise, as mentioned, it moves the wedge 31 to the right, and thus frees the bedknife 12 to place it completely under the influence the spring 22, as previously mentioned. Once the cutting edge 14 abutts the reel 13, the bedknife 12 cannot move any further in the counterclockwise direction. Then, the lever 27 can be returned to its shown upright position, and that is a position to where the wedge 31 is completely free to move to the left and along the incline 33 to its maximum position of wedging between the surfaces 32 and 33. That position of the wedge 31 thus holds the bedknife 12 against the force of the spring 22, and therefore the bedknife cutting edge 14 is not spring urged against the reel circumference 11 during the cutting operation and therefore there is not excessive wear on those parts.

However, the adjustment of the cutting edge 14 against the reel circumference 11 has been accomplished, and therefore that adjusted position will be retained by virtue of the spring 22 holding the bedknife against the wedge 31. It will of course be seen and understood that a compression spring 36 extends between the wedge 31 and a part 37 of the mower frame 10, and that spring 36 of course automatically urges the wedge 31 leftward, against the position of the pusher 29. In that manner, the adjustment or positioning of the cutting edge 14 without any clearance relative to the circumference 11 of the cutting reel 13 will always be accomplished and that position for the cutting edge will be retained until the next adjustment. That is, distortion, wear, or the like between the cutting parts will alter the no clearance or contact of the parts, as mentioned, but, rotation of the lever 27 and the action of the spring 22 and the final re-positioning of the lever 27 and subsequent leftward movement of the wedge 31 will all re-establish the contact position for the cutting edge 14, as desired.

FIG. 2 shows another embodiment, and here there is a bedknife 41 pivotally mounted on a pin 42 which would be on the mower frame 43, and the bedknife cutting edge 44 is presented to the lawn mower conventional reel 46 and its cutting blades 47. A heavy spring 48 urges the bedknife 41 clockwise, as the spring is associated with the mower frame 49, as indicated. That urges the cutting edge 44 toward the mower reel 46.

An upright arm 51 is pivotally connected at 52 to the bedknife 41 and slidably extends through the mower frame piece 52, for instance. The upper end of the upright 51 slidably abutts a wedge 53 to urge the wedge 53 upwardly against an inclined surface 54 on a pivot arm 56 pivotally mounted on the mower frame by means of the pivot pin 57, for instance. A hold down member, in the form of a screw 58, is mounted on the mower frame piece 59 and is available for urging the pivot member 56 downwardly. Also, a fixed stop 61 is positioned above the pivot member 56 and also is available for limiting the counterclockwise or upward movement of the member 56. Finally, a stop member 62, in the form of the threaded member shown, is positioned on the mower frame part 63 and beneath the arm 56, to limit the clockwise or lowering movement of the arm 56, for a purpose hereinafter mentioned.

With that arrangement, when the hold down member 58 is moved away from the pivot arm 56, the spring 48 will urge the bedknife 41 toward the reel 46. Actually, the upward movement of the pivot arm 56 is then limited by the stop 61, if so desired. In a position where the cutting edge 44 is contacting the reel blade 47 and thereby limiting the clockwise movement of the bedknife 41, and when the pivot arm 56 is upwardly against the stop 61, the wedge 53 is free to move to the left along the incline plane or surface 54, and that movement can be induced by a tension spring 64 connected at 66 with the wedge 53 and connected at 67 with the arm 56. The wedge 53 therefore removes any freedom in the various connections mentioned, and that is while the cutting edge 44 is in contact with the reel 46, as mentioned.

Subsequently, the screw 58, or any other hold down means employed, can be applied to the pivot arm 56 to rotate it clockwise about its pivot 57 until the arm underneath surface 68 contacts the end of the stop screw 62. That action is translated through the upright 51 and induces a counterclockwise pivotting of the bedknife 41 about its pivot pin 42 to therefore move the bedknife cutting edge 44 away from the tip of the reel blade 47. That establishes the desired clearance between the reel 46 and the cutting edge 44. That particular clearance is a clearance designated 69 and is that which can be initially set between the arm surface 68 and the tip of the screw 62, as shown. Therefore, in the FIG. 2 embodiment, a clearance, in accordance with the clearance 69 and depending upon the geometry such as that shown, will be established between the reel 46 and the cutting edge 44, as desired. That is, when any hold down member, such as the member 58, releases the pivot arm 56, the arm 56 will move upwardly until the cutting edge 44 contacts the reel 46, as shown. That of course can be accomplished without a stop 61, though the stop 61 does control the arm 56 and thus also controls the wedge 53. At that point of contact, the clearance 69 can be established to establish the ultimate and desired clearance between the cutting edge 44 and the reel 46. Finally, when the arm 56 is brought down to the stop 62, as mentioned, then the wedge 53, which is then in the snug position between the incline 54 and the tip of the standard 51, will also be urged downwardly and thus remove any joint clearances and will force against the spring 48 and pivot the bedknife 41 counterclockwise for the bedknife clearance desired.

The system thus employs the pivotal bedknife 41 under the influence of a spring 48 which also urges against the pivotal arm or lever 56 which in turn is limited by the hold down member 58 and the optional stop 61. Then, the lower stop 62 determines the amount of clearance for the cutting edge 44 when the lever 56 is urged downwardly, such as by means of the hold down screw 58. Both embodiments of FIGS. 1 and 2 therefore utilize a wedge, which is of course also in the nature of a cam or the like which secures the respective bedknives 12 and 41 against the urgings of their respective springs 22 and 48. Of course the respective wedges 31 and 53 are shaped to conform to the inclined or ramp surfaces 33 and 54, as respectively shown. Additional similarity is with respect to the wedge springs 36 and 64 which urge the respective wedges into their snug positions described. The portions 16 and 51 are connecting members, relative to the movable cutting member; and surfaces 33 and 54 are surfaces supported on the mower frames.

What is claimed is:

1. In a lawn mower having cutting members consisting of a rotatable reel and a bedknife, both having cutting edges thereon, and with one of said cutting members being movable toward and away from the other of said cutting members for adjusting the clearance between the cutting edges, and the mower having a frame, the improvement comprising a spring operative between said frame and said one of said cutting members for yieldingly urging said one of said cutting members toward said other of said cutting members, said mower having a ramp surface, a connecting member connected with said one of said cutting members and being movable therewith and being spaced from said ramp surface on said mower frame, and with said connecting member and said ramp surface defining a wedge-shaped space therebetween, and with the size of said wedge-shaped space being determined by the movement of said connecting member relative to said surface, a movable wedge disposed within said wedge-shaped space for limiting movement of said one of said cutting members in the direction toward said other of said cutting members, to influence the clearance between said cutting edges, and a spring connected with said wedge for yieldingly urging said wedge into said wedge-shaped space.

2. The lawn mower, as claimed in claim 1, including a control movably mounted on said frame and operative on said wedge for moving said wedge along said ramp surface for releasing the limiting of movement of said one of said cutting members toward said other of said cutting members.

3. The lawn mower, as claimed in claim 2, wherein said control is a lever pivoted on said frame and operable against the influence of said spring acting on said wedge for releasably moving said wedge, whereby said spring operative between said frame and said one of said cutting members urges said cutting edges to contact each other for automatically setting the cutting relationship between said cutting edges when said wedge is released.

4. The lawn mower, as claimed in claim 1, including means for moving said one of said cutting members away from said other of said cutting members, and a stop operatively associated with said one of said cutting members for limiting the movement of said one of said cutting members away from said other of said cutting members and under the influence of said means for moving to thereby establish a clearance between said cutting edges.

5. The lawn mower as claimed in claim 4, wherein said stop is adjustable for adjustably setting said clearance.

6. In a lawn mower having cutting members consisting of a rotatable reel and a bedknife, both having cutting edges thereon and with one of said cutting members being movable toward and away from the other of said cutting members for adjusting the clearance between the cutting edges for a desired final cutting clearance therebetween, and the mower having a frame, the improvement comprising means for moving said cutting edges toward and away from each other operatively connected with said one of said cutting members and being movable therewith a spring connected with said one of said members for yieldingly urging said one of said members toward said other of said cutting members to a limit position wherein said cutting edges on said cutting members in contact with each other, a spacer member mounted on said frame and being adjacent said means for moving to be adjustably spaced therefrom to a final position a distance of said desired final cutting clearance of said cutting edges from each other when said cutting edges are in their said limit position of contact with each other and to be in contact with said means for moving when in said final position and at the time when said cutting edges are spaced apart, and a member operatively associated with said means for moving to releasably secure said means for moving in contact with said spacer member and being movably mounted on said frame and engageable with said means for moving and thereby move said one of said cutting members away from said other of said cutting members through said distance of said final cutting clearance and to where said means for moving contacts said spacer member.

7. The lawn mower, as claimed in claim 6, including a wedge operatively associated with said means for moving away from said spacer member to establish said distance between said spacer member and said means.

8. The lawn mower, as claimed in claim 7, including a wedge spring connected with said wedge for yieldingly urging said wedge into position of moving said means away from said spacer member.

9. The lawn mower, as claimed in claim 6, wherein said spacer member is a threaded member threadedly mounted on said frame for adjustable movement toward and away from said means.

* * * * *